United States Patent
Kutlugil

(10) Patent No.: US 7,239,039 B2
(45) Date of Patent: Jul. 3, 2007

(54) ELECTRONIC SWITCHING MODULE

(76) Inventor: Mehmet Kutlugil, Kunt Electronik San. ve Tic. A.S., Ikitelli Org. San. ve Bolgesi, Turgut Ozal Cad. No.:216, Ikitelli 34670, Istanbul (TR)

( * ) Notice: Subject to any disclaimer, the term of this patent is extended or adjusted under 35 U.S.C. 154(b) by 0 days.

(21) Appl. No.: 10/520,391

(22) PCT Filed: Jul. 3, 2002

(86) PCT No.: PCT/TR02/00027

§ 371 (c)(1),
(2), (4) Date: Sep. 16, 2005

(87) PCT Pub. No.: WO2004/005078

PCT Pub. Date: Jan. 15, 2004

(65) Prior Publication Data

US 2006/0119178 A1    Jun. 8, 2006

(51) Int. Cl.
*B60L 1/00* (2006.01)
*B60L 3/00* (2006.01)
*H02G 3/00* (2006.01)

(52) U.S. Cl. .................. 307/9.1; 307/10.1
(58) Field of Classification Search .......... 307/9.1, 307/10.1; 361/709
See application file for complete search history.

(56) References Cited

U.S. PATENT DOCUMENTS

| | | | | |
|---|---|---|---|---|
| 4,557,225 A | * | 12/1985 | Sagues et al. | 123/41.31 |
| 5,268,815 A | * | 12/1993 | Cipolla et al. | 361/704 |
| 5,548,481 A | * | 8/1996 | Salisbury et al. | 361/709 |
| 6,054,765 A | | 4/2000 | Eytcheson et al. | |
| 6,278,199 B1 | | 8/2001 | Grant et al. | |
| 6,891,705 B2 | * | 5/2005 | Bryan | 361/2 |
| 2001/0028197 A1 | | 10/2001 | Yamane et al. | |

FOREIGN PATENT DOCUMENTS

| | | |
|---|---|---|
| DE | 100 08 582 A | 8/2000 |
| EP | 0 714 228 A | 5/1996 |
| EP | 1 138 553 A | 10/2001 |
| JP | 06 164347 A | 4/1994 |

\* cited by examiner

*Primary Examiner*—Stephen W Jackson
*Assistant Examiner*—Carlos Amaya
(74) *Attorney, Agent, or Firm*—Venable, Campillo, Logan & Meaney PC

(57) ABSTRACT

The present invention relates to an electronic switching module that can directly be mounted without any modifications, instead of the electromagnetic DC relays used in various vehicles. The electronic switching module (15) consists of a plastic casing (1) protecting said module against the external environmental conditions, an aluminium block (2) preventing over-heating of the electronic circuit, a semiconductor switching element transistor (3), a printed circuit card (4) on which the electronic circuit elements are arranged, a cover (5) wherein said printed circuit card is placed and the contacts (6) to provide the connection to the power circuit.

11 Claims, 2 Drawing Sheets

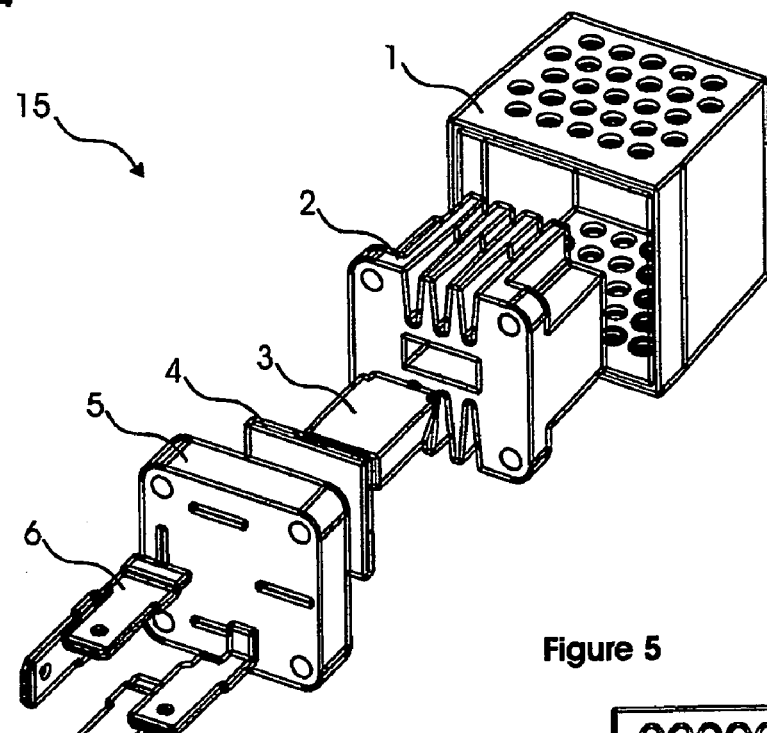
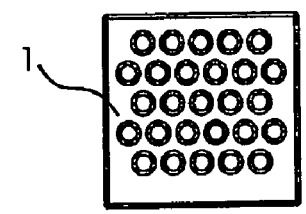
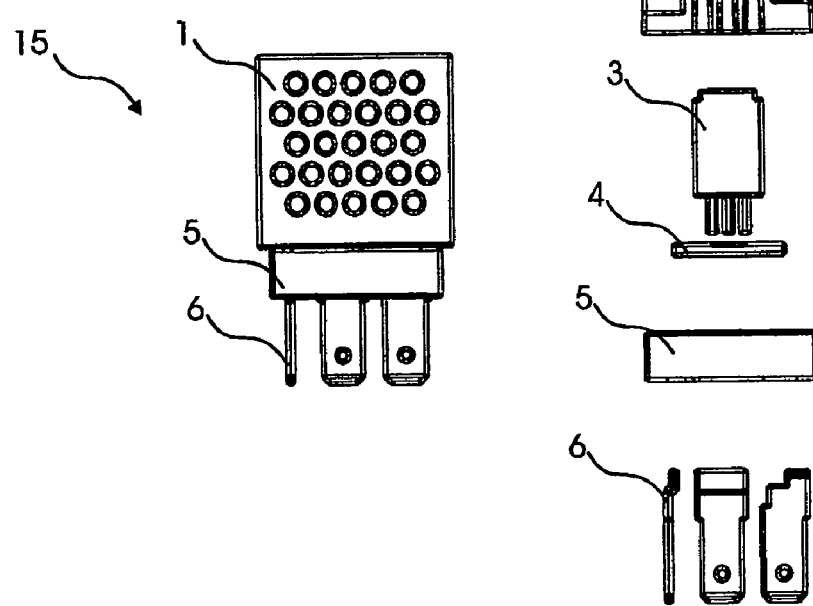

ELECTRONIC SWITCHING MODULE

The present invention relates to an electronic switching module that can directly be mounted without any modifications, instead of the electromagnetic DC relays used in various vehicles.

In the state of art, the electrical accessories in the vehicles are driven by direct current. For instance electromagnetic relays are used in many components of a vehicle, such as the lamps, heater, automatic door-locking, automatic window-lifting, diesel heater plug, windscreen-wiper, ventilator, signal mechanism, starter motor drive (actuator), air-conditioning system, fuel pump, injector, ABS (Antilock Braking System), ESR (Electronic Speed Reduction), ASR (Anti-Spin regulation), TCS (Traction Control System), retarder, transmission and power train. Furthermore, electromagnetic DC relays are used in some industrial applications.

However, said electromagnetic relays have numerous disadvantages:

- As the contact made and broken by the magnetic field created by the coil of the driving circuit, is mechanical, noise is generated while opening/closing the circuit.
- The electromagnetic relays cause electromagnetic pollution in the related electric circuit, which in turn leads to negative impacts on the electronic mechanisms used in today's technology.
- As the result of the mechanical contact, the switching on/of speeds of the electromagnetic relays are low, in other words, their response times are guide high, e.g. 100-200 ms. This slow switching on-off delays the reaction time of the system and also causes the wearing (abrasion) of the contact.
- The supply circuit for the electromagnetic relay, draws a current of appr. 50-200 mAmps. Such a high value of current requires a great amount of power consumption as well as leading to various problems. Primarily, the coil and the contact opposing the coil warm-up by time and lead to arc formation while making and/or breaking contact Both heating and arc formation create corrosive impacts that may damage the contact and therefore the relay. Particularly in transportation vehicles, wherein passenger safety is very important, defective electromagnetic relays lead to numerous accidents. Moreover, even if the relay is not damaged in case of an accident, the arcs formed may deflagrate the fuel in the tank and cause combustions. Furthermore, the corrosive effects created by the atmospheric conditions and/or by the arcs formed, result in an increase in contact resistances of said relays. In such relays with increased contact resistance, heat losses increase and the system starts to operate inefficiently. Finally, as thick cables are required to be used to draw high current also in driving circuits, the cost increases significantly as the length of the cable increases.

The electromagnetic relays operate at determined tolerances under a given voltage. These differences are defined by the driving voltage limits between 8% 10%. When said limits are exceeded, the relays will have negative impact on the operation of the module either by heating-up or by not providing the required response.

In the electronic switching module, a very broad driving range is provided. In brief, an electronic switching module (either a 12 VDC or 24V DC module) operates at both voltage bands without any problems. Additionally, it has such features as self fault-detection and providing information, as compared to the electromagnetic relays.

In the EP No. 1207622, semi conductor relays are disclosed; wherein these are AC relays; not DC relays. The tristors used in said invention are silicon particles used to obtain DC polarization by taking advantage of the alternating current/voltage.

The object of the present invention is to realize an electronic DC switching module, that can easily and removably be installed without any modification requirements, in place of the electromagnetic relays, which is applicable and economical.

The electronic switching module realized to attain the above mentioned purposes of the present invention has been illustrated in the attached drawings, wherein;

FIG. 4, is the exploded side view of the electronic switching circuit.

FIG. 5, is the exploded front view of the electronic switching circuit.

FIG. 6, is the mounted, side view of the electronic switching circuit.

Figure 1:
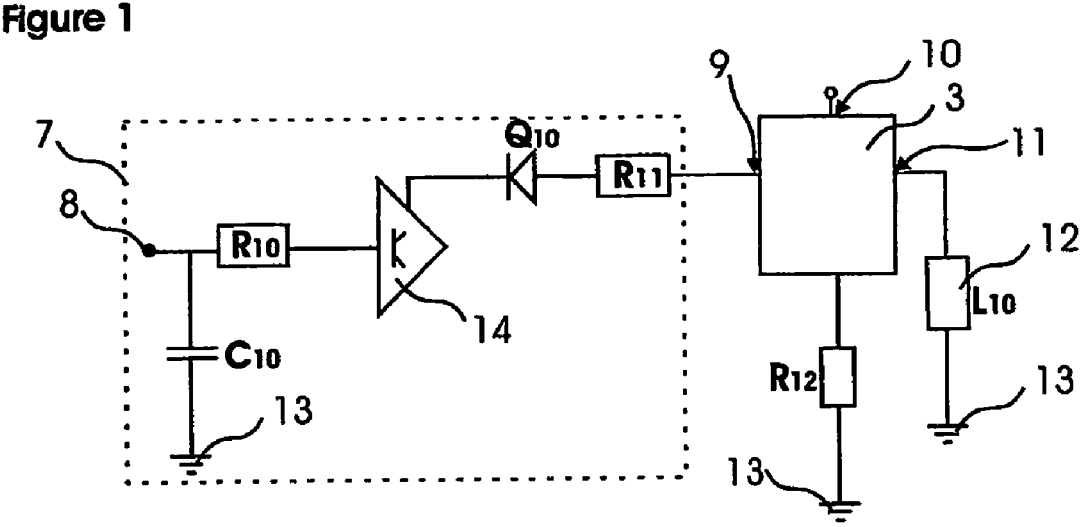
FIG. 1, is the schematic view of the electronic switching circuit

The components shown in the drawings have been enumerated separately as shown bellow:

1. Plastic casing
2. Aluminium block
3. Transistor (CM)
4. Printed circuit card
5. Cover (Lid)
6. Contacts
7. Drive circuit
8. Triggering DC source
9. Inlet (Gate)
10. DC source (Drain)
11. Source
12. Load
13. Frame (Ground)
14. LO (Logic ORDER)
15. Electronic Switching Module In a preferred embodiment of the invention, the electronic switching module (15) consists of a plastic casing (1) protecting said module against the external environmental conditions, an aluminium block (2) preventing over-heating of the electronic circuit, a semiconductor switching element transistor (3), a printed circuit card (4) on which the electronic circuit elements are arranged, a cover (5) wherein said printed circuit card is placed and the contacts (6) to provide the connection to the power circuit. (FIGS. 4 to 6).

The plastic casing (1) protecting said module against the external environmental conditions, also insulates electrically said module. Said casing may be held without burning the hand, even at high temperatures. It is provided with a row of perforations, to allow heat transfer.

The prismatic aluminium block (2) closes the periphery of the circuit in order to provide a more rapid outwards transmission of heat formed in the circuit Fins are provided on said block (2), to increase the heat transmission.

The semiconductor switch element transistor (3) is used to operate the power circuit including the load (12) by the current supplied the DC source to the driving circuit.

The transistor (3) and the electronic circuit elements placed on the drive circuit (7) are arranged on the printed circuit card (4), which in turn takes place at the upper section of the cover (5). The contacts (6) are mounted to the lower section of the cover (5). Said cover and contacts are so arranged that no modifications will be required for placing the contacts in the previously used electromagnetic relay contact guides.

FIG. 1 shows the diagram of the electronic circuit that takes place on the printed circuit card in the electronic switching module. The driving circuit (7) consists of a triggering DC source (8); a resistance ($R_{10}$), a LO (14), a diode ($Q_{10}$) and a second resistance ($R_{11}$) all connected in series to said source and a capacitor ($C_{10}$) connected in parallel to all these, and a chassis (frame) (13). Said circuit, comprises a transistor (3) which is connected to the drive circuit (7) from its inlet (gate) end (9). The DC source (drain) (10) end of the transistor (3) is connected to the triggering DC source (8) whereas its source (11) end is connected to a resistance ($R_{12}$) and a load ($L_{10}$) leading towards the frame (13).

When the circuit shown in FIG. 1 is used in the module, current supplied from the DC source is transmitted to the transistor inlet (9) gate, to bigger the transistor. Then the transistor passes to a conducting state (switch closes) and the current of the power circuit, supplied from the DC source (Drain) (10) end is transmitted to the source (11) end, and activates the power circuit by passing over the load, by means of the contacts.

Resistance ($R_{12}$) provides the control of the current flowing over the load and by this feature, it diagnostically protects the circuit elements which it keeps under control, within the limits of the current parameters it allows.

In this protection procedure, there is not any risk of being damaged at the end of the operation, as it is the case with typical fuses.

When the negative impacts of the conditions are eliminated, it restarts the system and protects it against next possible negative conditions. These conditions are, thermal factors, over-voltage and over-current parameters.

Here, extremely low inner resistance and capacity of the transistor (3) and in connection with this, a very high gate resistance bring the transistor in inadvertent or not-commanded "on or off" positions with indefinite intervals, and this disturbs the operational stability. In order to avoid such a situation, the PWM (Pulse Wave Modulation) technique is employed. This technique is based on an improved LO technique developed to bring the semiconductor to the saturation or operational position. Over-voltage and current values are controlled with PWM in order to provide a more stable operation of the transistor.

Figure 2:
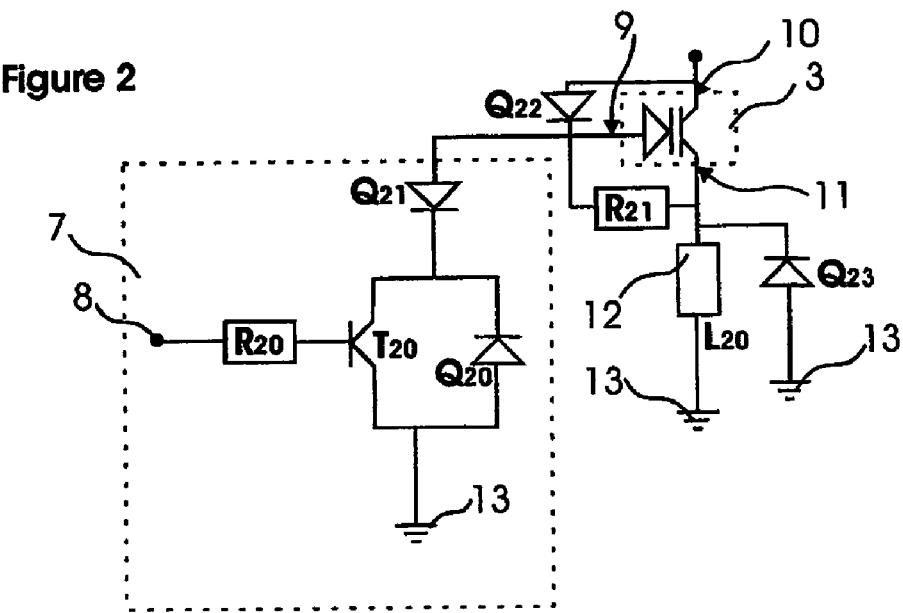
FIG. 2, is the schematic view of the electronic switching circuit, when the load is directed from the positive side to the negative side.

In another embodiment of the present invention, the circuit shown in FIG. 2, is used. In this circuit, driving circuit (7) consisting of a resistance ($R_{20}$) connected in series to a triggering DC source, a transistor ($T_{20}$) and diode ($Q_{20}$) connected to each other in parallel which are in turn connected in series, to said resistance a frame (13) connecting them to the ground and a diode ($Q_{21}$) connected in series to them, comprises a diode ($Q_{22}$), a transistor (10) and a resistance ($R_{21}$) connected to each other in parallel which are in turn connected to said driving circuit (7) in series, a triggering DC source (8) feeding said circuit and a diode ($Q_{23}$) and a load connected to each other in parallel which connect them to the frame (13).

When the module operates with the circuit shown in FIG. 2, the load is left at the continuous fame (13) (negative) side of the electromagnetic field. The battery voltage is sent to the driving circuit (7) and to the load (12) in a controlled manner. Since the inner resistance is low, a negligible voltage is created between the DC source (Drain) (10) and the source (11). It is not possible to control said minimal voltage difference, from the inlet (9). Said difference is suppressed by PWM. The effect of the minute (negligible) inner resistance between the DC source (Drain) (10) and the source (11) is eliminated by different impact intervals and thus a voltage difference is created to carry on the module in an uninterrupted mode.

The driver portion of the circuit and the module operate in accordance with the cyclic structure of the ground. To obtain a 100% conformity to be relay activity in car/vehicle technology, the leading-in of the driver portion and the positive one-way alternation to the frame (13) is realized through the polarisation of the npn transistor.

Diode compounds are arranged on the driving circuit, in order to protect the module against the effects of the reverse currents formed on the ground cycle.

In another embodiment of the present invention (FIG. 3), the circuit consists of a resistance (R30) fed from a triggering DC source (8), a transistor (10), two resistances (R31, R32) connected to each other in parallel which are in turn connected to said resistance, and a frame (13) which connects the above components to the ground.

Figure 3:
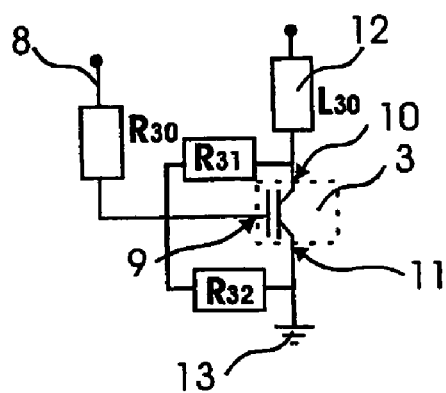
FIG. 3, is the schematic view of the electronic switching circuit, in case when the transistor (3) at the lower side of the load is driven.

When the module operates with the circuit shown in FIG. 3, the main difference observed, between this circuit and that shown in FIG. 2 is that the inner resistance of the load on the structure present in the system, is greater than the inner resistance of the transistor (3), and this creates a voltage difference which is sufficient to operate the transistor (3). Here, pulse modulation is not required. The input voltage is synchronous with the system voltage and is in the blocking direction.

This keeps the transistor (3) in transmitting mode continuously and constantly. When the input voltage is eliminated, the transistor (3) does not realize any transmission. As there is no logic order in such implementations, the on/off periods of the silicon chip is kept at the range of 4,5 micro seconds, because the delay structure in electronic medium is negligible. Whereas said period is the optimum switching time.

More than one LO and transistor are used in order to obtain higher current values in the power circuit. Parallel operation of the transistors are ensured by simultaneously operating the transistors the which the LO'S are connected; thus increasing the current values obtained from the power circuit. Here the preliminary condition is the simultaneous operation of the transistors.

The inner temperature range of the electronic switching module is higher as compared to the electromagnetic relays.

The upper and lower limits of the junction temperatures are respectively, −40° C. and +150° C. The inner resistances are limited between 3 and 5 milliohms, even at the upper temperature limit. This difference is a crucial detail that differentiates between the electromagnetic relay and the electronic switching module.

Each electronic switching module is able to operate on an, 12V, 24V, 42V DC bands of the available relays. The fact that said module is operable on all kinds of voltage bands, provides flexibility in current control during production and as the current parameter is used for the storage of the switches produces, instead of the voltage parameter, stocking/storing is facilitated to a great extent In case the module operates at higher voltages, the transistor in the driving circuit may be replaced with a transistor having different-voltage and current values.

The switching period in the electronic switching module circuit is expressed in microseconds. By virtue of this short period, the module is switched on more rapidly and it operates more efficiently.

This rapid response feature of the module, minimizes the delays of the driving system that sends commands to the electromagnetic relays and solenoids, particularly in ABS and/or ESR systems. This feature eliminates the electromagnetic relay delay and enables the system to give slow responses only due to mechanical delays (solenoid rate of mobility), thus minimize the delays as much as possible. Whereas this effect accelerates the response time of ABS, ESB, ASR and EBV in a rate of 10 to 20%.

The module according to the present invention, also contributes in receiving more rapid responses as compared to electromagnetic relays, by means of a direct implementation in ABS, ESD, ASR technologies, by being used in drive units.

In the driving circuit (7) a low current at the level of microamperes is used to trigger the transistor (3). When the current of a value of 100 milliamperes (mA), required for the operation of the electromagnetic relays is taken into consideration, operating the power circuits with the switching module of the present invention will lead to a swing in current. As said electronic switching module is driven by low current and voltage, it does not involve any risks for human health. Furthermore it is able to activate more than one power circuit to be connected in parallel with a single drive circuit. In this case, said module is used as a switch. The most important detail is the simultaneous operation of the LO's; otherwise when each LO operates independently, the power circuit does not increase, it decreases. This undesired condition is solved by adding a RC circuit to the system.

It is also possible to use said module in smaller areas or as the base of PCB (Printed Circuit Board). The module is characterized in that it can be utilized in very small areas, if required.

This characteristic is derived from the SMD (Surface Mounted Device) or COB (Circuit On Board) technique. The electronic elements of the module are redesigned and placed in very small physical areas, e.g. several square centimeters.

In another embodiment of the present invention, the module is restructured in PCB logic, in order to create a control panel system, Said module, functions as a fuse, together with said panel.

In another embodiment of the present invention, the electronic switching module is used in the industry of arms; for electronic triggering, electronic mine and magazine systems; for moving the turret systems of the tanks or aircraft, and all types of applications that are commendable by electromechanical relays. In such systems, as the response times (circuit on/oft) and inner resistances are short, mechanical opening/closing speed and the number of bullet firing per unit time are increased. Furthermore, certain undesired conditions, temperature etc. that may occur within the system are evaluated by a computer and "stop/start" commands may be sent to some circuit elements.

The electronic switching module according to present invention has a simple structure, which facilitates its production and operation. It can be installed in the place of the old electromagnetic relays without any modifications and it can also be installed to new devices, without requiring a significant change in the production line.

In addition to these, the electronic switching module, eliminates the corrosive effects on the vehicles, by virtue of its high efficiency and response speed.

Due to the rapidnes of its responses, it does not create any disadvantages in the operation of the circuit with regard to dirtness and harmonic effects in the energy of the system.

The invention claimed is:

1. An electronic switching module that can directly be mounted instead of an electromagnetic DC relay used in various vehicles; the electronic switching module comprising a plastic casing (1) protecting said electronic switching module against the external environmental conditions, an electronic circuit including a drive circuit (7); a semiconductor switch in the form of discrete transistor (3); and a printed circuit card (4) on which the electronic circuit elements are arranged; an aluminum block (2) closing the periphery of the electronic circuit and preventing overheating of the electronic circuit, a cover (5) wherein said printed circuit card (4) is placed and contacts (6) that are mounted to the cover (5) to provide the connection to the power circuit; wherein the electronic circuit comprises the drive circuit (7) comprising a triggering DC source (8); a resistance ($R_{10}$), a LO (14), a diode ($Q_{10}$) and a second resistance ($R_{11}$) all connected in series to said source and a capacitor ($C_{10}$) connected in parallel to all these, and a chassis (frame) (13); a transistor (3) which is connected to the drive circuit (7) from its inlet (gate) end (9); a resistance ($R_{12}$), the DC source (drain) (10) end of the transistor (3) of which is connected to the source (11) end of the transistor; and a load ($L_{10}$).

2. The electronic switching module according to claim 1, wherein the electronic circuit comprises the drive circuit (7) comprising a resistance ($R_{20}$) connected in series to a triggering DC source, a transistor ($T_{20}$) and diode ($Q_{20}$) connected to each other in parallel which are in turn connected to said resistance in series, a frame (13) connecting them to the ground and a diode ($Q_{21}$) connected in series to them; a diode ($Q_{22}$), a transistor (10) and a resistance ($R_{21}$) connected to each other in parallel which are in turn connected to said driving circuit (7) in series, a triggering DC source (8) feeding said circuit and a diode ($Q_{23}$) and a load ($L_{20}$) connected to each other in parallel, which connect them to the frame (13).

3. The electronic switching module according to claim 1, wherein the electronic circuit comprises a transistor (10) and two resistances ($R_{31}$, $R_{32}$) connected to each other in parallel which are in turn connected to said resistance, and a frame (13) which connects the above components to the ground.

4. The electronic switching module according to claim 1, wherein the printed circuit card (4) comprises an electronic circuit wherein more than one LO and more than one simultaneously operating transistor, are used in order to obtain higher current values in the power circuit.

5. The electronic switching module according to claim 1, wherein the electronic circuit comprises a single drive circuit including simultaneously operating LO's and more tan one power circuit activated by being connected in parallel, wherein said module is used as a switch.

6. An electronic switching module that can directly be mounted instead of an electromagnetic DC relay used in various vehicles; the electronic switching module comprising a plastic casing (1) protecting said electronic switching module against the external environmental conditions and wherein the plastic casing (1) is provided with a row of perforations to allow heat transfer, an electronic circuit including a drive circuit (7); a semiconductor switch in the form of discrete transistor (3); and a printed circuit card (4)

on which the electronic circuit elements are arranged; an aluminum block (2) closing the periphery of the electronic circuit and preventing over-heating of the electronic circuit, a cover (5) wherein said printed circuit card (4) is placed and contacts (6) that are mounted to the cover (5) to provide the connection to the power circuit, wherein the electronic circuit comprises the drive circuit (7) comprising a triggering DC source (8); a resistance ($R_{10}$), a LO (14), a diode ($Q_{10}$) and a second resistance ($R_{11}$) all connected in series to said source and a capacitor ($C_{10}$) connected in parallel to all these, and a chassis (frame) (13); a transistor (3) which is connected to the drive circuit (7) from its inlet (gate) end (9); a resistance ($R_{12}$), the DC source (drain) (10) end of the transistor (3) of which is connected to the source (11) end of the transistor; and a load ($L_{10}$).

7. The electronic switching module according to claim 6, wherein the electronic circuit comprises the drive circuit (7) comprising a resistance ($R_{20}$) connected in series to a triggering DC source, a transistor ($T_{20}$) and diode ($Q_{20}$) connected to each other in parallel which are in turn connected to said resistance in series, a frame (13) connecting them to the ground and a diode ($Q_{21}$) connected in series to them; a diode ($Q_{22}$), a transistor (10) and a resistance ($R_{21}$) connected to each other in parallel which are in turn connected to said driving circuit (7) in series, a triggering DC source (8) feeding said circuit and a diode ($Q_{23}$) and a load ($L_{20}$) connected to each other in parallel, which connect them to the frame (13).

8. The electronic switching module according to claim 6, wherein the electronic circuit comprises a transistor (10) and two resistances ($R_{31}$, $R_{32}$) connected to each other in parallel which are in turn connected to said resistance, and a frame (13) which connects the above components to the ground.

9. The electronic switching module according to claim 6, wherein the printed circuit card (4) comprises an electronic circuit wherein more than one LO and more than one simultaneously operating transistor, are used in order to obtain higher current values in the power circuit.

10. The electronic switching module according to claim 6, wherein the electronic circuit comprises a single drive circuit including simultaneously operating LO's and more than one power circuit activated by being connected in parallel, wherein said module is used as a switch.

11. An electronic switching module that can directly be mounted instead of an electromagnetic DC relay used in various vehicles; the electronic switching module comprising a plastic casing (1) protecting said electronic switching module against the external environmental conditions and wherein the plastic casing (1) is provided with a row of perforations to allow heat transfer, an electronic circuit including a drive circuit (7); a semiconductor switch in the form of discrete transistor (3); and a printed circuit card (4) on which the electronic circuit elements are arranged; an aluminum block (2) closing the periphery of the electronic circuit and preventing over-heating of the electronic circuit and wherein the aluminum block (2) is a prismatic aluminum block with fins provided on it, in order to transfer to outside the heat created in the circuit more rapidly, a cover (5) wherein said printed circuit card (4) is placed and contacts (6) that are mounted to the cover (5) to provide the connection to the power circuit (6) wherein the electronic circuit comprises the drive circuit (7) comprising a triggering DC source (8); a resistance ($R_{10}$), a LO (14), a diode ($Q_{10}$) and a second resistance ($R_{11}$) all connected in series to said source and a capacitor ($C_{10}$) connected in parallel to all these, and a chassis (frame) (13); a transistor (3) which is connected to the drive circuit (7) from its inlet (gate) end (9); a resistance ($R_{12}$), the DC source (drain) (10) end of the transistor (3) of which is connected to the source (11) end of the transistor; and a load ($L_{10}$).

* * * * *